2,790,808

NOVEL CHEMICAL COMPOUNDS

Kuno Wagner, Erwin Müller, and Otto Bayer, Leverkusen, and Werner Grab, Wuppertal-Elberfeld, Germany, assignors to Schenley Industries, Inc., New York, N. Y., a corporation of Delaware No Drawing. Application January 5, 1956,
Serial No. 557,443

Claims priority, application Germany January 10, 1955

6 Claims. (Cl. 260—310)

This invention relates, generally, to novel organic chemical compounds and, more particularly, it relates to certain new and useful N-carboxy-3,5-pyrazolidinedione derivatives. Compounds of this type are useful agents in human therapy, being used as analgesics, and also in treatment of arthritis, gout, rheumatoid arthritis, bursitis, and acute arthritis of the joints.

The novel N-carboxy-3,5-pyrazolidinedione derivatives according to this invention include the compounds represented by the formula:

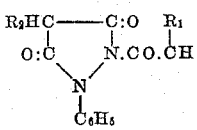

wherein $R_1$ is a radical chosen from the group consisting of phenyl, omega-chlorohexyl, n-hexyl, and 4-ethoxyphenyl, and $R_2$ is a radical chosen from the group consisting of hydrogen, n-butyl, and phenyl; the compounds represented by the formula:

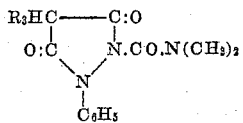

wherein $R_3$ is a radical chosen from the group consisting of phenyl, hydrogen, and n-butyl; the compounds represented by the formula:

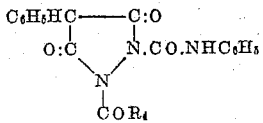

wherein $R_4$ is a radical chosen from the group consisting of ethoxy and anilino; the compound represented by the formula:

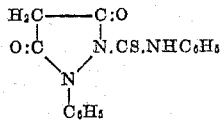

and the compound represented by the formula:

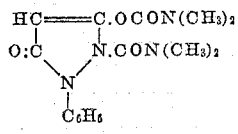

The foregoing formulae, it will be noticed, represent the keto-form tautomers of the diones. As will be obvious to one skilled in the chemical arts, these compounds are capable, also, of existing in an enol-form tautomer; the keto-form being favored by an acidic environment; the enol-form, by a basic environment; and the conversion of one of the tautomeric forms to the other being effected merely by changing the environmental conditions. It is to be understood, therefore, that sodium and other alkali-metal salts of the foregoing compounds, obtainable by treating the keto-form tautomers with an alkali-metal hydroxide solution whereby enol-form tautomers are produced and converted into readily water-soluble alkali-metal salts, are within the spirit of this invention.

More specifically, the novel compounds according to this invention consist of: 1-phenyl-2-anilinocarbonyl-3,5-pyrazolidinedione, 1-phenyl-2-anilinocarbonyl-4-n-butyl-3,5-pyrazolidinedione, 1-phenyl-2-omega-chlorohexylaminocarbonyl-3,5-pyrazolidinedione, 1-phenyl-2-cyclohexylaminocarbonyl-3,5-pyrazolidinedione, 1-phenyl-2-(4-ethoxyanilinocarbonyl)-3,5-pyrazolidinedione, 1-ethoxycarbonyl - 2 - anilinocarbonyl - 4 - phenyl - 3,5 - pyrazolidinedione, 1,2-bis-anilinocarbonyl-4-phenyl-3,5-pyrazolidinedione, 1,4-diphenyl-2-anilinocarbonyl-3,5-pyrazolidinedione, 1-phenyl-2-dimethylaminocarbonyl-3,5-pyrazolidinedione, 1,4-diphenyl-2-dimethylaminocarbonyl-3,5-pyrazolidinedione, 1-phenyl-2-dimethylaminocarbonyl-4-n-butyl-3,5-pyrazolidinedione, 1-phenyl-2-anilinothiocarbonyl-3,5-pyrazolidinedione, and 1-phenyl-2-dimethylaminocarbonyl-3-(N,N-dimethylcarbamoyloxy) - 2,5 - dihydropyrazolone-5.

It is known that reactive derivatives of malonic acid or C-substituted malonic acids, such as their esters, halides or ester-halides, may be reacted with hydrazine or substituted hydrazines, in the presence of a condensing agent or acid acceptor, to produce 3,5-pyrazolidinediones. For example, C-n-butylmalonic acid dichloride may be reacted with sym-bis-phenylhydrazine to produce butazolidine (1,2-bis-phenyl-4-n-butyl-3,5-pyrazolidinedione), a substance that has been used in human therapy as an analgesic, and in treatment of arthritis, gout, rheumatoid arthritis, bursitis, and acute arthritis of the joints. Heretofore, however, this reaction has been limited in its application to strongly basic substituted hydrazines, such as sym-bis-phenylhydrazine, and it has not been applied to, nor has it been thought to be applicable to, reactions involving semicarbazides and thiosemicarbazides.

It is now found that malonic acid halides and, also, C-substituted malonic acid halides may be reacted with semicarbazides and thiosemicarbazides to yield amide derivatives of N-carboxy- and of N-carbothionyl-3,5-pyrazolidinediones, and that certain of the products so obtained are therapeutically valuable substances.

Among the malonic acid halides now found to be satisfactory for this purpose are malonic acid dichloride and such C-substituted malonic acid halides as C-phenylmalonic acid dichloride, C-n-butylmalonic acid dichloride, and β-ethoxyethylmalonic acid dichloride. Among the semicarbazides that may be used are 1,4-substituted semicarbazides, such as 1,4-diphenyl-semicarbazide, 1-phenyl-4,4-dimethylsemibarbazide, 1-phenyl-4-α-pyridylsemicarbazide, and 1,4,4-triphenylsemicarbazide.

It is remarkable and surprising that malonic acid halides and C-substituted malonic acid halides can be reacted smoothly with semicarbazides and thiosemicarbazides in this manner, for it would be expected that the reactivity of hydrogen atoms at the amide groups of the latter reagents would result in undesirable side-reactions and formation of undesired by-products.

It is found, further, that this same type of compounds may be produced by reacting 3,5-pyrazolidinediones, unsubstituted in the 2-position, with isocyanates, isothiocyanates, or carbamic acid chlorides, whereby a substituted carboxylic acid amide or a substituted carbothionic acid amide group is introduced as a substituent at the 2-position of the 3,5-pyrazolidinedione. This reaction, too, is remarkable and surprising as it is konwn that reactive methylene group hydrogen atoms add to isocyanates, which here does not occur, and, futher, that the 3,5-pyrazolidinediones are capable of entering into this reaction while in their enol-forms. These reactions proceed with unexpected smoothness, yielding the desired products in substantially quantitative amounts, without side-reactions, when carried out using a large excess of the isocyanate or isothiocyanate as a reaction medium without use of other solvent media or catalysts. In general, the desired products are obtained merely by dissolving the substituted 3,5-pyrazolidinedione in the selected aliphatic, hydroaromatic, aromatic or heterocyclic isocyanate, isothiocyanate, or carbamic acid halide. In general, the isothiocyanates react less readily than the isocyanates, and it is preferred, in these instances to use a tertiary amine, such as hexahydrodimethylaniline, as a catalyst and to conduct the reaction at an elevated temperature and for a considerable period of time, say for some hours at a temperature above 100° C.

Among the 3,5-pyrazolidinediones that are suitable for use in this type of reaction are 1-phenyl-3,5-pyrazolidinedione, 1-phenyl-4-n-butyl-3,5-pyrazolidinedione, 4-phenyl-3,5-pyrazolidinedione, and 1,4-bis-phenyl-3,5-pyrazolidinedione.

It has been observed that the carboxylic acid amide substituent groups in the 2-position in the compounds of this invention are subject, more or less, to decomposition and intramolecular rearrangement in a manner analogous to compounds wherein a carboxylic acid ester group occupies this position in the molecule. For example, upon heating a 3,5-pyrazolidinedione-2-carboxylic acid amide derivative above its melting point, the corresponding isocyanate is formed; likewise, upon treatment of these compounds with a hydrolyzing agent, the isocyanate first forms, then it is converted to the corresponding carbamide. The stability of the carboxylic acid amide derivative under these conditions, it is found, depends upon the other substituents of the pyrazolidinedione nucleus and, also, upon the type and degree of substitution of the nitrogen atom of the amide group.

The novel compounds in accordance with this invention are suitable for use as pharmaceuticals and for use as intermediates in synthesis of other useful compounds. The compounds of this invention are of a type useful in therapy as analgesics and in treatment of arthritis, gout, rheumatoid arthritis, bursitis, and acute arthritis of the joints. It is notable, for instance, that the antiinflammatory activity of 1-phenyl-2-anilinocarbonyl-3,5-pyrazolidinedione is at least equal to that of butazolidine, while it is much better tolerated and produces fewer side reactions than that drug does in test animals. The other compounds of the invention also are active physiologically and show promise of usefulness in therapy in combating pathogens antagonistic to humans and animals.

To facilitate a fuller and more complete understanding of the subject matter of this invention and of the presently preferred methods for preparing the novel compounds in accordance therewith, certain specific examples herewith follow. It is to be understood clearly, however, that these examples are provided by way of illustration, merely, and that they are not to be construed as imposing any limitations on the invention as defined by the claims.

EXAMPLE 1

*Synthesis of 1-phenyl-2-anilinocarbonyl-3,5-pyrazolidinedione.*—About 14.25 parts by weight of malonic acid dichloride is introduced, at ordinary room temperature and while constantly stirring, into a suspension of 22.7 parts by weight of powdered 1,4-diphenylsemicarbazide in about 120 parts by weight of anhydrous benzene. It is found that the temperature of the reaction mixture rises to about 35° C. within half an hour. The 1,4-diphenylsemicarbazide gradually disappears into solution and the reaction product, 1-phenyl-2-anilinocarbonyl-3,5-pyrazolidinedione, begins to separate from the reaction mixture in crystalline form. After stirring the reaction mixture at room temperature for about two hours, a stream of dry nitrogen is passed therethrough, blowing off a large amount of hydrogen chloride, then the reaction mixture is filtered to recover the reaction product as the filtration residue. This product is recrystallized from benzene, yielding small, colorless needles, melting at 152°–153° C. This product may be prepared by another method substantially as follows: About 35.2 parts by weight of 1-phenyl-3,5-pyrazolidinedione is dissolved in 119 parts by weight of phenylisocyanate, with stirring and under anhydrous conditions, at a temperature of 130° to 140° C. After the reaction mixture has been maintained at this temperature for about ten minutes, the reaction product begins to separate. The mixture is slowly cooled, yielding a slurry of crystals which are removed by filtration, washed with a little low-boiling petroleum ether and recrystallized from benzene. This product melts at 152°–153° C.

EXAMPLE 2

*Synthesis of 1 - phenyl - 2 - anilinocarbonyl-4-n-butylpyrazolidinedione-3,5.*—About 19.9 parts by weight of n-butylmalonic acid dichloride, which may be prepared by reacting C-n-butylmalonic acid with thionyl chloride, is introduced, at ordinary room temperature and while stirring, into a suspension of approximately 22.7 parts by weight of powdered 1,4-diphenylsemicarbazide in about 90 parts by weight of anhydrous benzene. After about two hours, the suspended material has disappeared into solution and the reaction is substantially completed. The yellowish benzene solution is blown with a stream of dry nitrogen to remove hydrogen chloride dissolved therein, then it is filtered and a low-boiling petroleum ether is carefully added to the filtrate until a slight turbidity appears. The reaction product, 1-phenyl-2-anilinocarbonyl-4-n-butyl-3,5 - pyrazolidinedione, separates from the reaction mixture as dense felted needles which, after being recrystallized from a minimal quantity of benzene, are found to melt at 98° C. This product may be prepared by another method substantially as follows: About 46.6 parts by weight of 1-phenyl-4-n-butyl-3,5-pyrazolidinedione, which may be prepared by reacting C-n-butylmalonic acid dimethyl ester with phenylhydrazine in ethanol using sodium alcoholate as a condensing agent (M. P., 98° C.), is dissolved, at 100° C. and with stirring, in 70 parts by weight of phenylisocyanate and the reaction mixture is maintained at this temperature for about five minutes. After cooling slowly to room temperature, the reaction product, after a few hours, begins slowly to crystallize from the reaction mixture as fine needles which, after being separated by filtration, washed with a little petroleum ether and recrystallized from a minimal quantity of benzene, are found to melt at 98° C.

EXAMPLE 3

*Synthesis of 1-phenyl-2-omega-chlorohexylaminocarbonyl - 3,5 - pyrazolidinedione.*—About 17.6 parts by weight of powdered 1-phenyl-3,5-pyrazolidinedione is dissolved in 70 parts by weight of omega-chlorohexylisocyanate, while stirring and heating at a temperature of about 130° C. After the viscous, yellowish reaction mixture has been allowed to stand for four to five days, the desired reaction product separates therefrom as a crystalline mass which is recovered by filtration.

EXAMPLE 4

*Synthesis of 1 - phenyl-2-cyclohexylaminocarbonyl-3,5-pyrazolidinedione.*—About 17.6 parts by weight of 1-phenyl-3,5-pyrozolidinedione is dissolved in 70 parts by weight of cyclohexylisocyanate at a temperature of about 140° C. and the reaction mixture is maintained at this temperature for ten minutes. Upon slowly cooling the mixture, the reaction product, 1-phenyl-2-cyclohexylaminocarbonyl-3,5-pyrazolidinedione, separates as crystals which are recovered by filtration and recrystallized from a minimal quantity of benzene, yielding colorless needles, melting at 142°–143° C.

EXAMPLE 5

*Synthesis of 1-phenyl-2-(4-ethoxyanilinocarbonyl)-3,5-pyrazolidinedione.*—About 17.6 parts by weight of 1-phenyl-3,5-pyrazolidinedione is dissolved, while stirring and at a temperature of 140° C., in 80 parts by weight of 4-ethoxyphenylisocyanate and the reaction mixture is maintained at this temperature for about five minutes. After slowly cooling the mixture, a slurry of the crystalline reaction product is obtained, from which the crystals are recovered by filtration, recrystallized from benzene, and recovered as colorless needles, melting at 153° C.

EXAMPLE 6

*Synthesis of 1 - ethoxycarbonyl - 2 - anilinocarbonyl - 4 - phenyl - pyrazolidinedione - 3,5.*—About 12.4 parts by weight of powdered 1-ethoxycarbonyl-4-phenyl-3,5-pyrazolidinedione, which may be obtained by reacting 1-ethoxycarbonylhydrazine with phenyl-malonic acid dichloride in anhydrous ether, is dissolved, while stirring and at a temperature of 140° C., in 80 parts by weight of phenylisocyanate. After the reaction mixture has been allowed to cool to ordinary room temperature and to stand for about twelve hours, petroleum ether is added to cause precipitation of the reaction product, which is recovered and recrystallized from benzene, yielding crystals melting at 185°–186° C.

EXAMPLE 7

*Synthesis of 1,2 - bis - anilinocarbonyl - 4 - phenyl - 3,5-pyrazolidinedione.*—About 17.6 parts by weight of powdered 4-phenyl-3,5-pyrazolidinedione is added, with stirring, to 100 parts by weight of phenylisocyanate; the mixture is heated at a temperature of 140° C. and maintained at this temperature for about ten minutes, then the difficultly soluble reaction product which separates from the mixture is removed by filtration and recrystallized from ethyl acetate, yielding crystals melting at 240° C.

EXAMPLE 8

*Syntheis of 1,4 - diphenyl - 2 - anilinocarbonyl - 3,5-pyrazolidinedione.*—About 25.2 parts by weight of powdered 1,4-diphenyl-3,5-pyrazolidinedione, which may be obtained by reacting C-phenylmalonic acid dichloride with phenylhydrazine, is dissolved, while stirring at a temperature of 140° C., in 100 parts by weight of phenylisocyanate. Upon slowly cooling the reaction mixture, the reaction product separates as fine needle-like crystals which, after recrystallization from benzene, melt at 147° C.

EXAMPLE 9

*Synthesis of 1- phenyl - 2 - dimethylaminocarbonyl-3,5-pyrazolidinedione.*—About 70.5 parts by weight of malonic acid dichloride is introduced slowly and with constant stirring at ordinary room temperature into a suspension of 89.5 parts by weight of 1-phenyl-4,4-dimethylsemicarbazide in 405 parts by weight of anhydrous benzene, while a stream of dry nitrogen is passed through the reaction mixture. Within half an hour, the temperature of the reaction mixture rises to about 35° C. and strong evolution of hydrogen chloride occurs. The suspended material slowly disappears into solution and separation of the reaction product begins. After about five hours, most of the hydrogen chloride formed during the reaction is removed. The reaction product is recovered from the mixture by filtration, washed with a little cold methanol, and recrystallized from benzene, yielding colorless needles, melting with decomposition at 184°–185° C.

EXAMPLE 10

*Synthesis of 1,4-diphenyl-2-dimethylaminocarbonyl-3,5-pyrazolidinedione.*—About 108 parts by weight of C-phenylmalonic acid dichloride is introduced slowly, with constant stirring and at room temperature, into a suspension of 89.5 parts by weight of 1-phenyl-4,4-dimethylsemicarbazide in 405 parts by weight of anhydrous benzene, while a stream of nitrogen continuously is passed through the reaction mixture. After six hours, the reaction mixture is extracted with aqueous sodium hydroxide solution (1 N), the separated aqueous phase is filtered, acified by addition thereto of hydrochloric acid, the precipitated reaction product is recovered by filtration and recrystallized from benzene, yielding silky, matted needles, melting at 186°–187° C. This product may be obtained, also, by another method substantially as follows: About 108 parts by weight of C-phenylmalonic acid dichloride is introduced slowly, while stirring constantly and at a temperature of 0°–5° C., into a mixture of 89.5 parts by weight of 1-phenyl-4,4-dimethylsemicarbazide, 121.2 parts by weight of dimethylaniline, and about 320 parts by weight of anhydrous benzene. After being stirred for about five hours, the slurry of crystals is filtered, the residue is washed with dilute aqueous hydrochloric acid, then dissolved in aqueous sodium hydroxide solution, reprecipitated by acidification of the alkaline solution and recrystallized twice from benzene. The product so obtained melts at 186°–187° C. This same product may be obtained, also by the following method: A mixture of 36 parts by weight of 1-phenyl-4,4-dimethylsemicarbazide and 36 parts by weight of C-phenylmalonic acid is triturated with 66 parts by weight of phosphorus trichloride, and the mixture is heated at a temperature of about 60° C. for one half hour. This resin-like mixture is covered with comminuted ice and ice water is added, causing separation of the reaction product. Impurities are removed by treatment with hydrochloric acid (1 N) and the product, after being recrystallized several times from benzene, is found to melt at 186°–187° C.

EXAMPLE 11

*Synthesis of 1-phenyl-2-dimethylaminocarbonyl-4-n-butyl-3,5-pyrazolidinedione.*—About 99.5 parts by weight of C-n-butylmalonic acid dichloride is introduced slowly, while stirring constantly at ordinary room temperature and while passing a stream of dry nitrogen through the mixture, into a suspension of 89.5 parts by weight of 1-phenyl-4,4-dimethylsemicarbazide in about 540 parts by weight of anhydrous benzene. The temperature of the reaction mixture is raised to about 40° C. and maintained at this temperature for four hours, during which most of the hydrogen chloride produced by the reaction is removed from the reaction mixture. The benzene solution is concentrated by evaporation under vacuum and the residue is extracted with aqueous sodium hydroxide solution (1 N), the alkaline extract is made acidic by addition of aqueous hydrochloric acid, and the reaction product, which separates as a viscous oil, is removed by extraction with ether. After standing, crystals form in the ethereal solution and are removed by filtration and recrystallized from water, yielding long needles, melting at 92°–93° C.

EXAMPLE 12

*Synthesis of 1-phenyl-2-anilinothiocarbonyl - 3,5 - pyrazolidine-dione.*—About 28.3 parts by weight of malonic acid dichloride is introduced, while stirring constantly at ordinary room temperature, into a suspension of 48.6 parts by weight of powdered 1,4-diphenylthiosemicarbazide in about 270 parts by weight of anhydrous benzene. After standing about two hours, the reaction mixture is blown with a stream of dry nitrogen, undissolved residual material in the solution is removed by filtration, and the reaction product is thrown from solution by addition of petroleum ether. The powdery product so obtained, after crystallization from a mixture of benzene and petroleum ether, is obtained as small needles, melting at 84°–85° C.

EXAMPLE 13

*Synthesis of 1-phenyl-2-dimethylaminocarbonyl-3-(N,N-dimethylcarbamoyloxy)-2,5-dihydropyrazolone-5.*—About 17.6 parts by weight of 1-phenyl-3,5-pyrazolidinedione is dissolved, with stirring at a temperature of about 120° C., in 70 parts by weight of dimethylcarbamic acid chloride. Hydrogen chloride is evolved and the mixture is maintained at this temperature for a period of three hours, then it is diluted with about 140 parts by weight of ether and filtered to remove tarry reaction by-products. Petroleum ether is added until a slight turbidity is observed, then the solution is permitted to stand. The reaction product is obtained as long, yellowish needles, melting at 110°–111° C.

In Example 7 hereinabove, the starting material 4-phenyl-3,5-pyrazolidinedione may be prepared from C-phenylmalonic acid and hydrazine hydrate, reacted in ethanol and using sodium ethoxide as a condensing agent.

Having thus described the subject matter of this invention, what it is desired to secure by Letters Patent of the United States is:

1. As a new composition of matter, a chemical compound selected from the group consisting of the compounds represented by the formula:

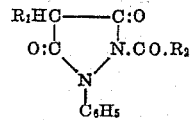

wherein $R_1$ is a radical chosen from the group consisting of hydrogen, phenyl, and n-butyl; and $R_2$ is a radical selected from the group consisting of anilino, 4-ethoxy-anilino, and dimethylamino.

2. As a new composition of matter, 1-phenyl-2-anilinocarbonyl-3,5-pyrazolidinedione.

3. As a new composition of matter, 1-phenyl-2-(4-ethoxyanilinocarbonyl)-3,5-pyrazolidinedione.

4. As a new composition of matter, 1-phenyl-2-dimethylaminocarbonyl-3,5-pyrazolidinedione.

5. As a new composition of matter, 1,4-diphenyl-2-dimethylaminocarbonyl-3,5-pyrazolidinedione.

6. As a new composition of matter, 1-phenyl-2-dimethylaminocarbonyl-4-n-butyl-3,5-pyrazolidinedione.

No references cited.